United States Patent
Edelhaeusser et al.

(10) Patent No.: US 8,791,860 B2
(45) Date of Patent: Jul. 29, 2014

(54) CONCEPT FOR DETERMINING AN ESTIMATED VALUE OF A LOCATION OF A RECEIVING ELEMENT

(75) Inventors: Thorsten Edelhaeusser, Nuremberg (DE); Joerg Nilson, Erlangen (DE); Hans Holm Fruehauf, Solingen (DE)

(73) Assignee: Fraunhofer-Gesellschaft zur Foerderung der Angewandten Forschung E.V., Munich (DE)

( * ) Notice: Subject to any disclaimer, the term of this patent is extended or adjusted under 35 U.S.C. 154(b) by 12 days.

(21) Appl. No.: 13/289,287

(22) Filed: Nov. 4, 2011

(65) Prior Publication Data
US 2012/0139791 A1   Jun. 7, 2012

Related U.S. Application Data

(63) Continuation of application No. PCT/EP2010/056214, filed on May 6, 2010.

(30) Foreign Application Priority Data

May 7, 2009   (DE) .......................... 10 2009 020 216

(51) Int. Cl.
*G01S 5/02* (2010.01)
(52) U.S. Cl.
CPC .................................. *G01S 5/0278* (2013.01)
USPC ........................................................... 342/451
(58) Field of Classification Search
CPC .............................. G01S 5/0257; G01S 5/0263
USPC .............. 342/357.25, 450, 451, 458; 701/300
See application file for complete search history.

(56) References Cited

U.S. PATENT DOCUMENTS

| | | | | |
|---|---|---|---|---|
| 5,452,211 | A | * | 9/1995 | Kyrtsos et al. ................ 701/470 |
| 6,401,037 | B1 | * | 6/2002 | Muller et al. ................. 701/300 |
| 7,203,501 | B2 | * | 4/2007 | Kim et al. .................. 455/456.1 |
| 2002/0115448 | A1 | * | 8/2002 | Amerga et al. ............... 455/456 |
| 2008/0065267 | A1 | | 3/2008 | Hong |

OTHER PUBLICATIONS

Terwilliger, M. et al, "Localization Using Evolution Strategies in Sensornets," IEEE Congress on Evolutinary Computing, Sep. 2005, pp. 322-327.*
Rossi, C. et al, "Pose Estimation with Multiple Sources Using Evolutionary Alogirthms," IEEE Symposium on Intelligent Signal Processing, Oct. 2007. pp. 1-6.*

(Continued)

*Primary Examiner* — Gregory C Issing
(74) *Attorney, Agent, or Firm* — Michael A. Glenn; Perkins Coie LLP

(57) ABSTRACT

Apparatus for determining an estimated value for a location of a receiving element within a reference system which may receive signals of a signal source movable to different measuring positions, it being possible to measure—on the basis of the signals received—localization data which indicate a relative location of the receiving element with respect to the movable signal source, the apparatus being configured to determine the estimated value on the basis of at least two different measuring positions and localization data corresponding thereto by means of an evolutionary algorithm. On the basis of the localization data measured, a fitness function of the evolutionary algorithm is formed, the localization data having an angle of arrival of the received signals on the receiving element, and/or a signal arrival time from which a distance from the signal source may be determined.

14 Claims, 11 Drawing Sheets

(56) References Cited

OTHER PUBLICATIONS

Qin, H. et al, "A Multiobjective Evolutionary Tracking Indoor Positioning Algorithm for Smart Space," Second International Conference on Genetic and Evolutionary Computing, 2008, pp. 42-46.*
Edelhäußer et al. "Autonomous Configuration Method for Real-Time Location Systems", Adaptive Hardware and Systems, 2009. AHS 2009. NASA/ESA Conf. on IEEE, Jul. 29, 2009, pp. 265-272.
Hähnel et al. Mapping and Localization with RFID Technology: Proc. IEEE Int. Conf. on Robotics and Automation, 2004, pp. 1015-1020.
Hui et al. Survey of Wireless Indoor Positioning Techniques and Systems, IEEE Trans. on Systems, Man and Cybernetics—Part C vol. 37, 2007, No. 6, pp. 1067-1080.
Kemper et al. "Human-Assisted Calibration of an Angulation Based Indoor Location System", Sensor Technologies and Applications, 2008. SENSORCOMM '08. $2^{nd}$ Internat. Conf. on IEEE, Aug. 25, 2008, pp. 196-201.
Bae, et al., "Genetic Algorithm based Efficient Positioning Error Compensation Technique with Low Computational Complexity", IEEE Region Ten Conference (TENCON), Jan. 2009, 6 pages.
Zhao, et al., "A Hybrid Location Algorithm Based on BP Neural Networks for Mobile Position Estimation", Int'l Journal of Computer Science and Network Security, vol. 6, No. 7A, Jul. 2006, pp. 162-167.

* cited by examiner $0^{th}$ iteration $5^{th}$ iteration

10th iteration

15th iteration

CONCEPT FOR DETERMINING AN ESTIMATED VALUE OF A LOCATION OF A RECEIVING ELEMENT

CROSS-REFERENCE TO RELATED APPLICATIONS

This application is a continuation of copending International Application No. PCT/EP10/056214, filed May 6, 2010, which is incorporated herein by reference in its entirety, and additionally claims priority from German Application No. 10 2009 020 216.1, filed May 7, 2009, which is also incorporated herein by reference in its entirety.

The present invention relates to apparatus and methods for determining an estimated value for a location of a receiving element as may be employed, for example, for autonomously calibrating antenna positions of local radio position finding systems.

BACKGROUND OF THE INVENTION

It may be of interest for various applications to know the position of an object. Such applications include, for example, so-called indoor localization systems, which may localize a radio transmitter, e.g. on the basis of so-called radio fingerprints. Another field of application of increasing interest is the field of logistics, it being possible to use position finding systems to determine positions of goods to be logistically tracked. In the field of logistics, objects are often provided with so-called RFID (radio frequency identification) responders. By utilizing a reader comprising several reader antennas, it will then be possible, for example, to determine the position of an object to be localized. Another field wherein position finding systems may be employed is the field of localizing, or tracking, athletes and/or sports equipment, e.g. in soccer. Tracking of the athletes and the sports equipment (e.g. ball) enables determining statistics about the progress of a match, which may be very interesting for spectators.

A system which may track objects in real time with high accuracy will be referred to as a so-called real-time location (localization) system (RTLS) below, which enables interfering in or observing a process that is being tracked.

Known position finding systems such as GPS (global positioning system) or GALILEO, which is currently being installed, are not sufficiently accurate, or cannot be utilized at all, for specific applications, such as within buildings. Therefore, a real-time localization system uses an infrastructure of its own, which may be configured accordingly. This applies, in particular, to mobile localization systems, which may be employed in various locations, e.g. for sports events.

If localization systems based on wireless technology are employed, knowledge of one or more transmitting and/or receiving elements such as antennas, for example, may be used for position determination. In particular for mobile systems, which are installed at different locations with different infrastructures, as precise as possible a determination of the location, i.e. of a position and orientation, of the transmitting and/or receiving elements is useful for installation of the system.

While various technologies underlying the position finding systems are currently examined per se for their suitability for position determination, the subject of initialization, i.e. the determination of the position and orientation of localization antennas, of such position finding systems is hardly being addressed. To determine the location of a localization antenna of a position finding system, use is mostly made of manual methods such as laser calibration, for example. However, such manual methods of determining the locations of transmitting and/or receiving elements involve a lot of effort and are expensive in most cases.

SUMMARY

An embodiment may have an apparatus for determining an estimated value for a location of a receiving element within a reference system which may receive signals of a signal source movable to different measuring positions, it being possible to measure—on the basis of the signals received—localization data which indicate a relative location of the receiving element with respect to the movable signal source, the apparatus being configured to determine the estimated value on the basis of at least two different measuring positions and localization data corresponding thereto by means of an evolutionary algorithm, the apparatus being configured to iteratively determine the estimated value on the basis of a plurality of estimated-value individuals having estimated-value attributes for the location of the receiving element, the plurality of the estimated-value individuals forming an estimated-value population, the apparatus being configured to form, for each of the plurality of the estimated-value individuals in each iteration, a fitness function based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and the localization data having an angle of arrival of the received signals on the receiving element and/or a signal arrival time from which a distance from the signal source may be determined.

According to another embodiment, a system may have: a receiving element at a location within a reference system; a signal source that is movable to different measuring positions and which may send out signals that can be received by the receiving element, on which basis localization data may be determined which indicate a relative location of the receiving element with respect to the movable signal source; and an apparatus for determining an estimated value for the location of the receiving element within a reference system which may receive signals of a signal source movable to different measuring positions, it being possible to measure—on the basis of the signals received—localization data which indicate a relative location of the receiving element with respect to the movable signal source, the apparatus being configured to determine the estimated value on the basis of at least two different measuring positions and localization data corresponding thereto by means of an evolutionary algorithm, said apparatus being configured to iteratively determine the estimated value on the basis of a plurality of estimated-value individuals having estimated-value attributes for the location of the receiving element, the plurality of the estimated-value individuals forming an estimated-value population, said apparatus being configured to form, for each of the plurality of the estimated-value individuals in each iteration, a fitness function based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and the localization data having an angle of arrival of the received signals on the receiving element and/or a signal arrival time from which a distance from the signal source may be determined.

According to another embodiment, a method of determining an estimated value for a location of a receiving element within a reference system may have the steps of: sending out a signal at a known measuring position by means of a movable signal source; receiving the signal by means of the receiving element; determining, on the basis of the signal received, localization data which indicate a relative location of the receiving element with respect to the movable signal source; determining the estimated value on the basis of at least two different measuring positions of the signal source and of localization data corresponding thereto by means of a heuristic method, the estimated value being iteratively determined on the basis of a plurality of estimated-value individuals having estimated-value attributes for the location of the receiving element, the plurality of the estimated-value individuals forming an estimated-value population, a fitness function being formed, for each of the plurality of the estimated-value individuals in each iteration, said fitness function being based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and the localization data having an angle of arrival of the received signals on the receiving element and/or a signal arrival time from which a distance from the signal source may be determined.

Another embodiment may have a computer program for performing the method of determining an estimated value for a location of a receiving element within a reference system, which method may have the steps of: sending out a signal at a known measuring position by means of a movable signal source; receiving the signal by means of the receiving element; determining, on the basis of the signal received, localization data which indicate a relative location of the receiving element with respect to the movable signal source; determining the estimated value on the basis of at least two different measuring positions of the signal source and of localization data corresponding thereto by means of a heuristic method, the estimated value being iteratively determined on the basis of a plurality of estimated-value individuals having estimated-value attributes for the location of the receiving element, the plurality of the estimated-value individuals forming an estimated-value population, a fitness function being formed, for each of the plurality of the estimated-value individuals in each iteration, said fitness function being based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and the localization data having an angle of arrival of the received signals on the receiving element and/or a signal arrival time from which a distance from the signal source may be determined, when the computer program runs on a computer and/or microcontroller.

The finding of the present invention consists in solving the above object by automated and autonomous calibration of a position finding system while employing a heuristic method.

Many optimization problems cannot be solved, in practice, with accurate mathematical methods. In order to nevertheless be able to provide solutions, heuristic optimization methods may be employed. Strategies which are based on hypotheses and assumptions and are intended to accelerate the process of finding a solution with a certain likelihood, but without any guarantee, are called heuristics. Typical heuristics include utilizing known properties of solutions, imitating human problem-solving processes, or utilizing biological models.

Heuristic methods do not necessarily provide the optimum, but hopefully they provide useful approximate solutions within an acceptable amount of time. One fundamentally differentiates between design heuristics, which in most cases are set up in a very problem-specific, often rapid and simple manner, and improvement heuristics, which build upon design heuristics and try to improve solutions step by step by making changes. They are based on principles less dependent on problems and are often slower, but provide better results.

In informatics, heuristic methods are employed to obtain reliable solutions to a specific problem at low computing expenditure and within a short delay time. Classic algorithms try to guarantee the optimum computing time, on the one hand, and the optimum solution, on the other hand. Heuristic methods discard one or both of said aspirations so as to make a compromise, for complex tasks, between the computing expenditure and the quality of the solution found. To this end, one attempts to create a useful solution by means of estimations, rules of thumb, intuitive-intelligent guessing or further auxiliary assumptions without guaranteeing optimum properties.

Specific examples of heuristic methods are
evolutionary algorithm
particle swarm algorithm
ant algorithm
scatter search
taboo search, etc.

Embodiments of the present invention will be described below while using a heuristic method in the form of an evolutionary algorithm. To this end, an autonomously moving signal source, such as a robot, for example, may be employed which emits position finding signals at known absolute measuring positions, said position finding signals being received by a receiving element of the position finding system at an unknown absolute position and with an unknown absolute orientation, i.e. an unknown location. Depending on the embodiment of the present invention, localization data such as angle of arrival (AoA) of the position finding signal(s), time of arrival (ToA) of the position finding signal(s), or a round-trip time (RTT) of the position finding signal(s) may be determined from the position finding signals received. The localization data thus obtained, which indicate a relative location of the receiving element with respect to the movable signal source in each case, and the absolute positions, corresponding thereto, of the movable signal source may subsequently be handed over to a heuristic method, such as an evolutionary algorithm, for example, so as to determine an estimated value for the absolute location without having any knowledge of the sought-for absolute location of the receiving element.

The evolutionary algorithm (EA) designates an optimization method which uses biological evolution as a model. In this context, estimated-value individuals are described by their estimated-value attributes, i.e. estimated values for absolute position and orientation. The estimated-value individuals may assert themselves as being as suitable as possible with regard to selection conditions, and accordingly may—or may not—pass on their estimated-value attributes. In the course of several iterations, an estimated-value population will thus evolve to approximate the optimum, i.e. the actual absolute location, more and more closely.

To this end, embodiments of the present invention provide an apparatus for determining an estimated value for an absolute location of a receiving element which may receive signals of a signal source that is movable to different absolute measuring positions; on the basis of the signals received, localization data may be measured which indicate a relative location of the receiving element with respect to the movable signal source, the apparatus being configured to determine the estimated value on the basis of at least two different measuring positions and localization data corresponding thereto by means of a heuristic method such as an evolutionary algorithm, for example.

Said apparatus, or arithmetic unit, may be employed, in an inventive system, for initializing a position finding system, said position finding system including a receiving element at an absolute location, i.e. at an absolute position having an absolute orientation. The inventive initialization system further includes a signal source which is movable to different absolute measuring positions and may send out signals that may be received by the receiving element, and on the basis of which localization data may be determined which indicate a relative location of the receiving element with respect to the movable signal source. Finally, the initialization system comprises an apparatus for determining an estimated value for the absolute location of the receiving element on the basis of at least two different absolute measuring positions of the signal source and of localization data corresponding thereto by means of an evolutionary algorithm.

Consequently, the following inventive method may be performed:

1. setting the point of origin of a reference coordinate system to a suitable point,
2. placing the mobile signal source at a random known absolute measuring position (may be the origin of coordinates),
3. sending out an electromagnetic position finding signal at the known absolute measuring position by means of the movable signal source,
4. receiving the electromagnetic position finding signal by means of the receiving element, and determining, on the basis of the position finding signal received, localization data (AoA, ToA, RTT) which indicate a relative location of the receiving element with respect to the movable signal source,
5. unless at least two different measuring points are used, moving the mobile signal source to the next measuring point and going back to item 3, otherwise continuing with item 6,
6. starting a heuristic method (e.g. an evolutionary algorithm) with the data of the data storage.

In accordance with embodiments, a robot having an antenna may be used as the movable, or mobile, signal source. The robot may be able to autonomously move to each of the measuring points while determining its position, for example by means of odometry, an inertial navigation system (INS) or differential GPS. By means of a network connection (e.g. WLAN), the measuring positional data may be transmitted to an arithmetic unit for data storage, for controlling the mobile signal source and/or for calculating the heuristic method, or evolutionary algorithm.

In accordance with an embodiment of the present invention, the receiving element is an antenna array comprising at least two antenna elements, so that an angle of arrival of the electromagnetic position finding signal in relation to the orientation of the antenna array may be determined as localization data. However, other receiving element arrangements which enable determining, e.g., a time of arrival (ToA) of the electromagnetic position finding signal or a round-trip time (RTT) of a position finding signal are also feasible. To this end, temporal synchronization of the receiving element and the mobile signal source may be used.

Embodiments of the present invention have the advantage that automated calibration, i.e. automated location determination of transmitting and/or receiving elements of a position finding system, is possible without any knowledge of the absolute location of the transmitting and/or receiving elements. This is particularly advantageous for calibrating position finding systems wherein location determination of individual components by means of existing position finding systems, such as GPS, for example, is not possible or is not accurate enough. With the heuristic method, such as an evolutionary algorithm, no environment models are needed since an estimated-value population of the heuristic method iteratively evolves such that it approximates more and more the actual absolute location of the receiving element—with an evolutionary algorithm, this strictly follows the model of biological evolution.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
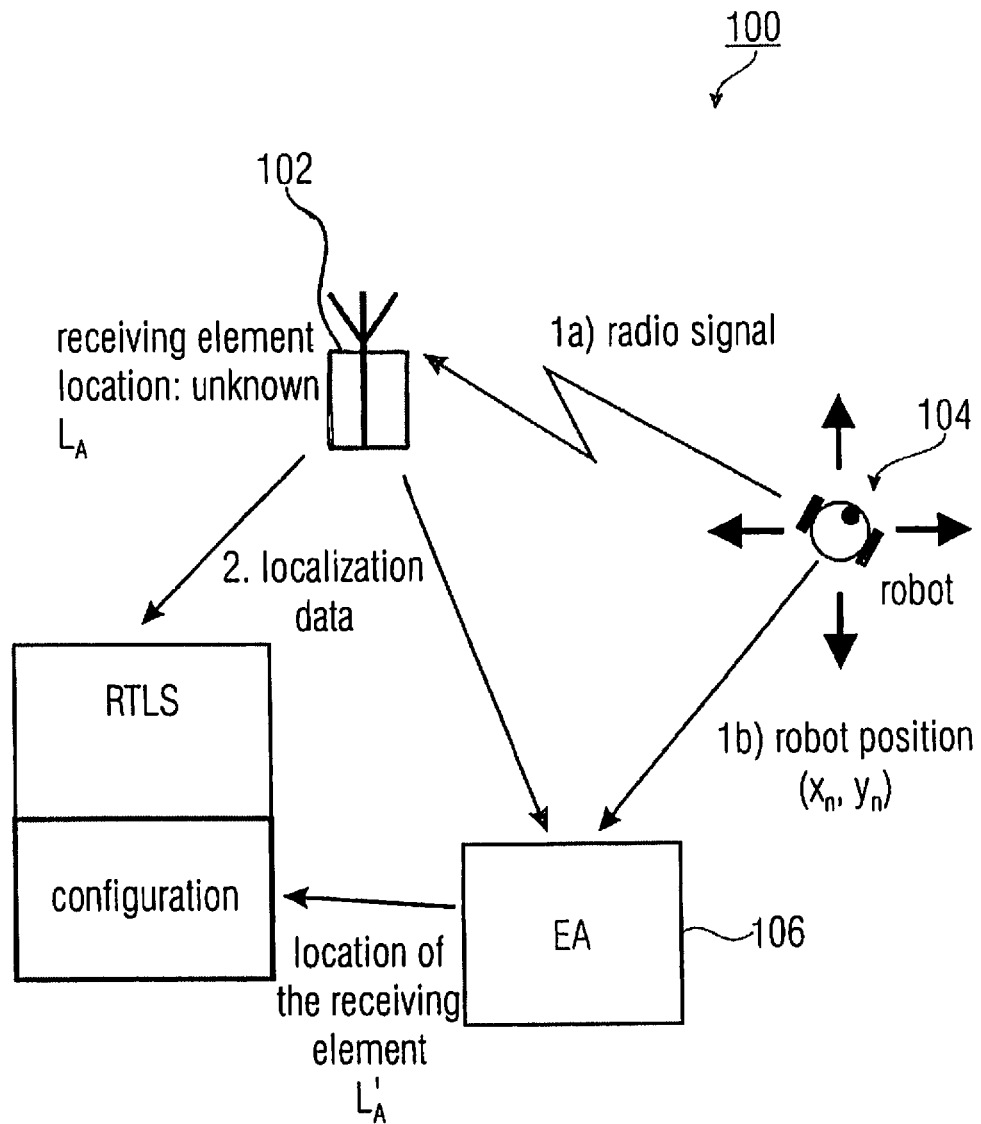
FIG. 1 shows a schematic representation of a system in accordance with an embodiment of the present invention.

FIG. 1 schematically shows a system 100 for initializing a real-time localization system (RTLS) in accordance with an embodiment of the present invention.

The system comprises a receiving element 102 having an unknown absolute position $(x_A, y_A)$ and an unknown orientation $(\alpha_A)$. The position $(x_A, y_A)$ and the orientation $(\alpha_A)$ are to be summarized below under the term "location" $L_A$ of the receiving element 102. Even though only two-dimensional positions $(x_A, y_A)$ will be described below for better understanding, the inventive concept is naturally also applicable to three-dimensional positions $(x_A, y_A, z_A)$.

The system 100 further includes a signal source 104, such as an autonomous robot, which is movable to different absolute measuring positions $(x_n, y_n)$ (n=1, 2, ..., N). At the measuring positions $(x_n, y_n)$, the signal source 104 may send out electromagnetic position finding signals which may be received by the receiving element 102. On the basis of the position finding signals received, localization data $\beta_n$, which indicate a relative location between the receiving element 102 and the movable signal source 104, may be determined by the receiving element 102.

The localization data and the N measuring positions $(x_n, y_n)$ corresponding to same are provided, via corresponding interfaces, to an apparatus 106 for determining an estimated value $L_A'$ for the absolute location $L_A$ of the receiving element 102. In this context, the estimated value $L_A'$ is determined on the basis of at least two different absolute measuring positions $(x_n, y_n)$ of the signal source 104 and localization data corresponding thereto by means of a heuristic method.

Prior to addressing in detail the apparatus 106 and/or the heuristic method performed therein in the form of an evolutionary algorithm, the individual elements of the system 100 will be described in more detail below.

The receiving element 102 is also part of the real-time localization system. To be able to localize a mobile transmitter, the real-time localization system has to have knowledge about an absolute position and an absolute orientation, or alignment, of one or more receiving elements, e.g. localization antennas. In the present invention it is essential for the receiving element 102 to provide localization data with regard to the transmitter 104, said localization data being dependent on the localization method used. In accordance with embodiments, localization data may be:

time of arrival (ToA),
round-trip time (RTT), or
angle of arrival of the position finding signal (AoA).

The localization data measured with the help of the receiving element 102 are provided, as is depicted by means of FIG. 1, to the apparatus 106 for estimating together with the measuring positions $(x_n, y_n)$ corresponding thereto during an initialization phase of the real-time localization system. Following estimation of the location of the receiving element 102, localization data are provided to the localization system (RTLS) itself, so that positions of objects to be localized may be determined—now using knowledge of absolute locations of the receiving elements used.

To illustrate the inventive concept, the following shall be based on the assumption of a receiving element 102 including an antenna array having at least two antenna elements, so that angles of arrival $\beta_n$ (n=1, 2, ..., N) of the radio signals of the mobile signal source 104 may be used as the localization data. For example, they may be radio signals within the 2.4 GHz band, as is employed, for example, in a WLAN system. An angle of arrival $\beta_n$ (n=1, 2, ..., N) designates an angle of the position finding signal received in relation to the absolute position $(x_A, y_A)$ and orientation $\beta_A$ of the receiving element 102.

Figure 6:
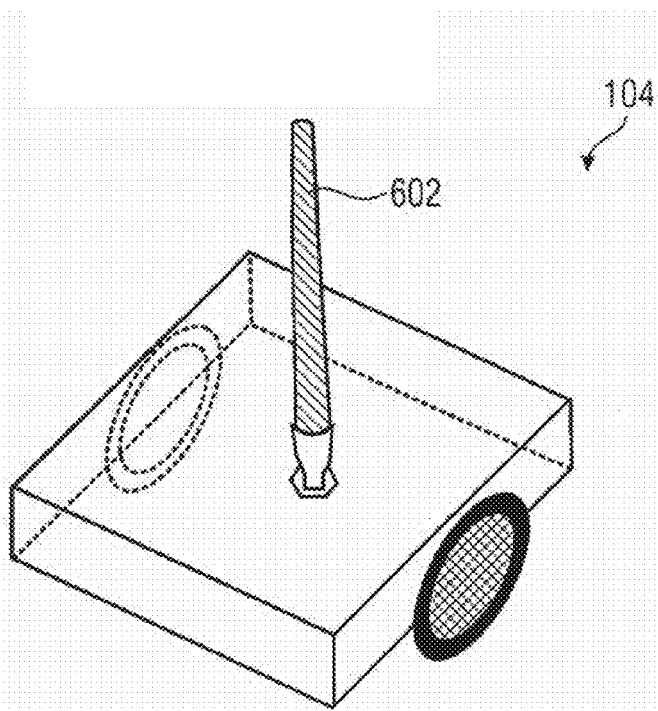
FIG. 6 shows an illustration of a movable signal source in accordance with an embodiment of the present invention.

The movable signal source 104 may be an autonomous robot, for example, which may independently head for various measuring positions $(x_n, y_n)$. The robot 104 is configured to determine its own measuring positions $(x_n, y_n)$ by means of odometry and to provide them, via an interface, to the apparatus 106 for estimating. Odometry designates position determination of a vehicle by means of observation of its wheels. It has the disadvantage that the positional accuracy decreases as the distance covered increases. The robot 104 is configured to automatically head for predefined measuring positions $(x_n, y_n)$. In addition, it may build a WLAN connection so as to communicate with the system 100 and in particular with the apparatus 106. In addition, the robot 104 is equipped with infrared sensors which can measure distances from obstacles so as to prevent collisions with said obstacles. An inventive signal source 104 in the form of a robot having an omnidirectional transmitting antenna 602 is depicted in FIG. 6 by way of example. By means of the receiving element 102 in the form of an antenna array, the localization data $\beta_n$ (angle of arrival) of radio signals emitted via the antenna 602 of the robot 104 may be determined.

Figure 2:
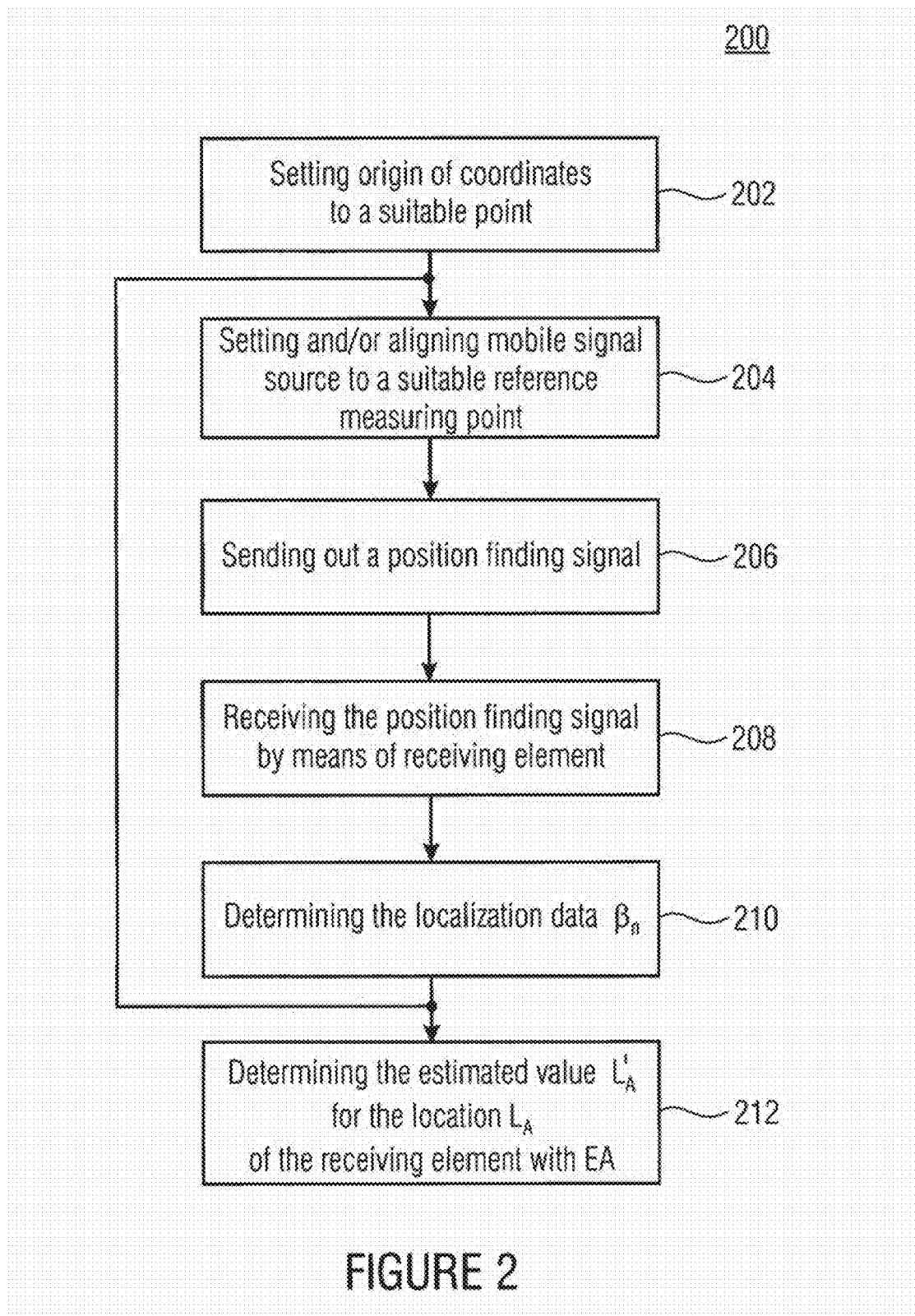
FIG. 2 shows a schematic flowchart of a method of determining an estimated value for an absolute location of a receiving element in accordance with an embodiment of the present invention.

One mode of operation of the inventive system 100 schematically shown in FIG. 1 is to be explained below by means of the schematic flowchart 200 in FIG. 2.

Figure 3:
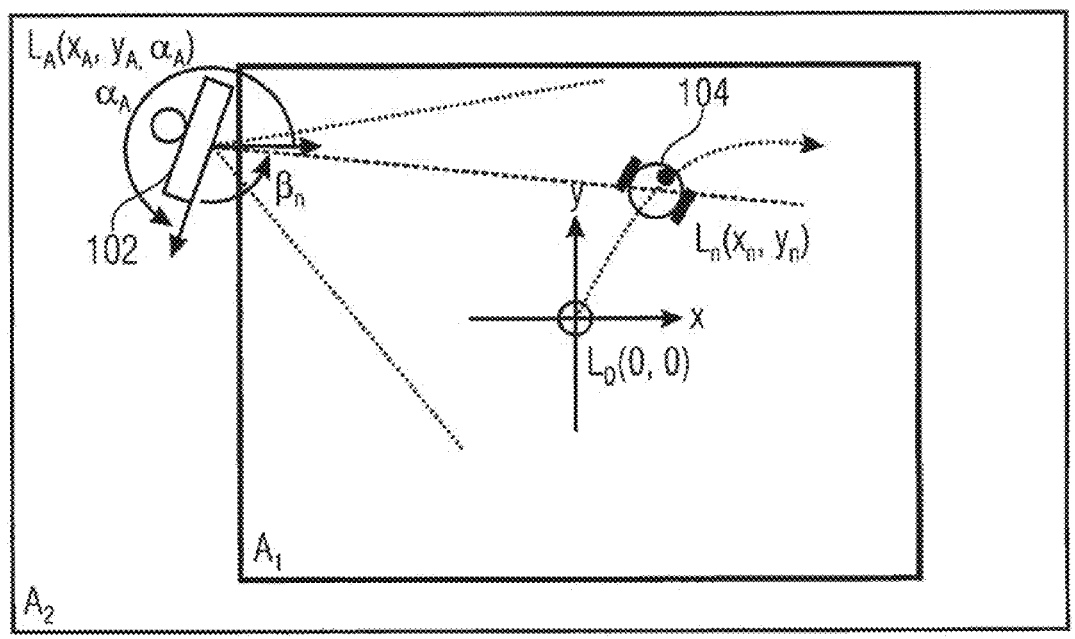
FIG. 3 shows a schematic representation of the location(s) of a receiving element and of a signal source in a reference coordinate system.

A first step 202 comprises setting an origin of a reference coordinate system to a suitable point, which will be referred to as $L_0(0,0)$ below (see FIG. 3).

A next step 204 comprises setting, or aligning, the mobile signal source 104 to a known first measuring point. Said point may be the origin of coordinates $L_0(0,0)$, for example.

A third step 206 comprises the mobile signal source 104 sending out a position finding signal at the known first measuring point. Said position finding signal may be a modulated or unmodulated radio signal which is received, in a step 208, by the receiving element 102 positioned at the unknown absolute location $L_A(x_A, y_A, \alpha_A)$.

A step 210 comprises determining, on the part of the receiving element 102 and on the basis of the position finding signal received, localization data which indicate a relative location of the receiving element 102 with respect to the mobile signal source 104. As was already mentioned above, the localization data may be an angle of arrival $\beta_n$ or signal run times. RSSI (received signal strength indicator) values may also be additionally or alternatively employed as localization data. Determination of an angle of arrival of a signal by means of an antenna array may be performed, for example, by means of so-called beam-forming techniques, wherein complex antenna weighting factors are suitably adjusted, and which are known from conventional technology. The $n^{th}$ angle of arrival $\beta_n$ measured which corresponds to the $n^{th}$ measuring position $(x_n, y_n)$ is transmitted to the estimation apparatus 106 along with this measuring position $(x_n, y_n)$.

In accordance with embodiments, the mobile signal source 104 is positioned at least two different measuring positions so as to be able to determine angles of arrival corresponding thereto on the part of the receiving element 102 in each case. This means, as long as a number n of data sets is smaller than N (N≥2), steps 204 to 210 are repeated. To this end, the mobile signal source 104, i.e. the robot, may independently circumnavigate obstacles so as to arrive at the next measuring point, whereas self-localization is performed by the mobile signal source by means of odometry.

If a sufficient number of data sets consisting of measuring-point coordinates ($x_n$, $y_n$) and angles of arrival $\beta_n$, have been recorded, the evolutionary algorithm will start, on the part of the apparatus 106 for estimating, in a step 212 on the basis of the N data sets transmitted to it.

In situations wherein an analytical solution of a problem is impossible, or wherein a solution cannot be found without unreasonable expenditure for efficiency reasons, evolutionary algorithms are often employed to find the best approximation possible to the solution. Evolutionary algorithms closely follow natural evolution and are frequently employed to solve optimization problems. Said algorithms rely on collective adaptation and learning ability of so-called individuals. Whenever mention is made of "individuals" below, they are understood to mean estimated-value individuals I having estimated-value attributes $x_1$, $y_1$ and $\alpha_1$ which correspond to the unknown location $L_A$ of the receiving element, i.e. $x_A$, $y_A$ and $\alpha_A$.

Evolution is capable of adapting even complex forms of life and organisms to their environmental and living conditions by manipulating the genetic makeup. It thus solves a very difficult optimization problem. Evolution's most astonishing property is the relative simplicity of its approach and the interaction of the various control mechanisms. In a simple model, the search process performed may be reduced to three biological principles: mutation, recombination, and selection.

Mutation of the genetic makeup is an undirected process, the meaning of which lies solely in producing alternatives and variants. From the point of view of optimization theory, the task of the mutation is to overcome local optima. Genetically, this corresponds to new genetic material, which is introduced into a population of individuals and maintains their diversity.

In terms of its contribution to achieving the target within the context of evolution, recombination (crossover) of the genetic information is somewhere between mutation and selection. The sites where a crossover between homologous chromosomes takes place are determined at random. However, actual recombination is no longer random. Genes that are located close to one another and are linked in terms of their functions are separated less frequently than groups of genes that are further apart. An evolutionary algorithm may do without recombination (i.e. there is asexual reproduction of the single individuals which includes only one parent/child); however, in specific cases, application of recombination is more efficient.

Selection is responsible for actual control of the search direction of evolution. It determines the direction in which the genetic material changes by specifying which phenotypes reproduce to a higher degree. If there were no disturbances, selection would therefore be a deterministic component within evolution. However, in nature, selection is disturbed again and again by mostly random events. Even those individuals that are best adapted to their environment may die due to an accident before producing offspring. Thus, the genetic information representing an optimum would be lost. Two further influences make selection an indeterministic factor. Firstly, it is not a constant, since the environment and the living conditions of the individuals may change; secondly, there is a feedback between the single individuals and their environment. Said individuals may influence their selection by interacting with the environment.

In algorithmic terms, representation of the individuals is of major importance. In addition, an evaluation method, also referred to as a fitness function, is essential to the performance of the evolutionary algorithms. The fitness function should be able to map the quality of any solutions as well as possible since it forms the selection criterion and thus defines the search direction. Fundamental rules are that the optimum solution should be evaluated as the maximum, while similar solutions should be evaluated similarly. In addition, as fine graduations as possible between "poor" and "good" solutions are helpful. Typically, evaluation is the computationally most intensive part of an evolutionary algorithm. As a rule, single individuals are evaluated independently in that they are mapped to a real value. The more strictly the evaluation method and the selection associated therewith operate, the higher a so-called selection pressure will be. The higher the selection pressure, the faster the population will converge to an estimated-value optimum, but the higher the risk will be that this is only a local optimum.

Therefore, each estimated-value individual I may be represented in two different ways: a genotype is the representation of the individual during a variation; a phenotype is used to represent a so-called fitness during the selection phase. A plurality of estimated-value individuals form an estimated-value population P, and each estimated-value individual I represents a possible solution to the problem.

Figure 4:
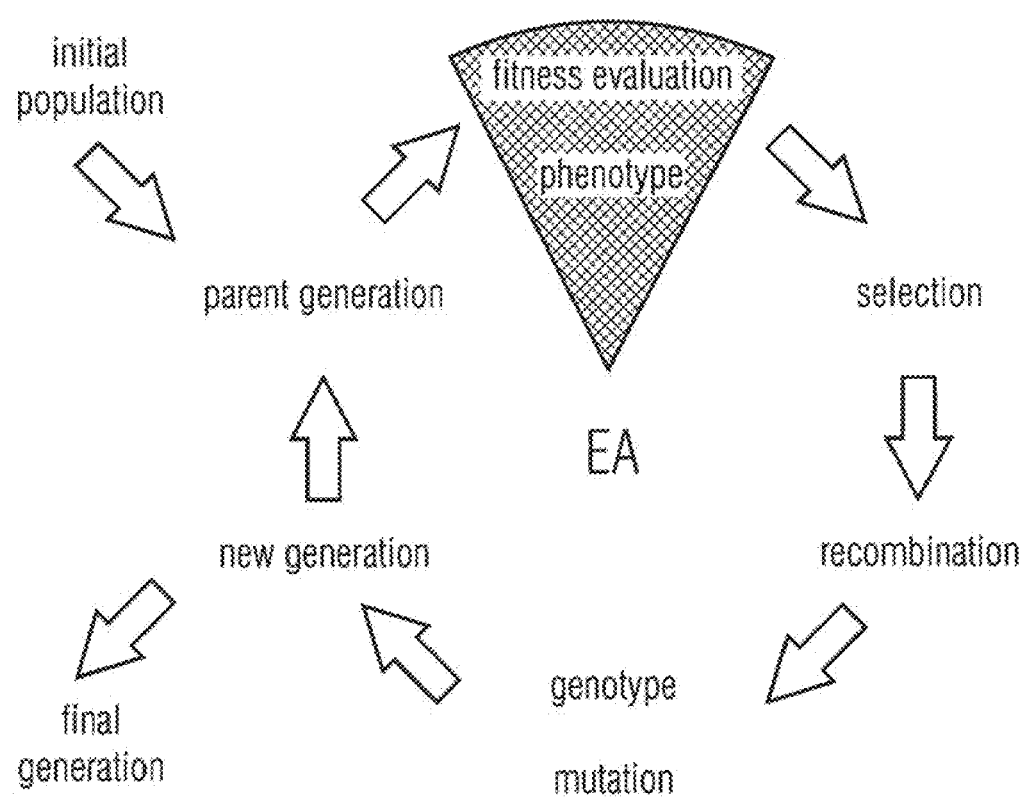
FIG. 4 shows a schematic representation of an evolutionary algorithm.

At the beginning, the single individuals I of the population and/or their attributes $x_1$, $y_1$ and $\alpha_1$ are randomly initialized with a meaningful result space. They may be changed by operators such as selection, mutation and recombination. Said changes lead to the development of each single individual I. During the development process, better and better individuals will result. Therefore, the likelihood of there being individuals that represent better solutions increases from generation to generation. The course of an evolutionary algorithm is schematically depicted in FIG. 4.

In addition to general aspects of the evolutionary algorithm, certain aspects may be adapted to the specific inventive application. Said adaptation is tremendously important to the efficiency of the corresponding system and to the quality of the results obtained:

transformation between phenotype and genotype
  fitness evaluation
  selection mechanism
  variation operators, and
  balance between selection and variation.

The basic types of evolutionary algorithms are evolutionary strategies, genetic algorithms and genetic programming.

One goal of embodiments of the present invention is to determine the configuration parameters of an RTLS. This means, the locations of the localization antennas and the directions in which they are arranged are to be determined. An RTLS will be able to calculate a position of a wireless receiver if the position and alignment of two or more antennas are known (2-D case).

Determination of the configuration parameters of a receiving element, i.e. the location determination, may be subdivided into two phases:
1. measuring the environment (steps 202 to 210) and
2. calculating the unknown location (step 212).

The first phase is independent of the subsequent calculation phase. This means that calculation may be effected downstream.

During the measuring phase, the robot 104 heads for N measuring points $L_n(x_n, y_n)$. At said measuring points $L_n(x_n, y_n)$, the measurements are performed, and one corresponding angle of arrival β of the signal(s) is determined in each case. Via its WLAN interface, the robot 104 continuously sends out position finding signals for the localization system. By means of beam-forming techniques performed by the receiving antenna array 102, the angle of arrival $β_n$ of said position finding signals may be calculated. The position finding system transmits the angle of arrival $β_n$ either directly to the estimation apparatus 106 or back to the robot 104, for example via Ethernet/WLAN. From there, the robot 104 may make the angle of arrival $β_n$ available to the estimation apparatus 106 together with the measuring point coordinates $(x_n, y_n)$ (n=1, 2, ..., N).

At the beginning, the robot, i.e. the mobile signal source 104, is positioned at a known starting position $L_0(0,0)$ with a predetermined orientation. The measuring phase is started, and the robot 104 receives a first angle of arrival $β_o$ from the localization system and stores it in a database together with the starting position $L_0(0,0)$. $L_0(0,0)$ is the first measuring point, and any further coordinates $L_n(x_n, y_n)$ are determined by the robot 104 itself in relation to the starting point $L_0(0,0)$ by means of odometry. In accordance with embodiments, the starting point $L_0(0,0)$ may coincide with the origin of coordinates, as is shown in FIG. 3. Subsequently, the robot 104 moves to a randomly selected point $L_n(x_n, y_n)$ within a predetermined limit ($A_1$). As soon as the robot 104 has arrived at the new measuring point $L_n(x_n, y_n)$, a new measurement will performed, and the angle of arrival $β_n$ determined for this purpose as well as the measuring point coordinates of the robot 104 will be written into the database. This is repeated (N−1) times.

Figure 5:
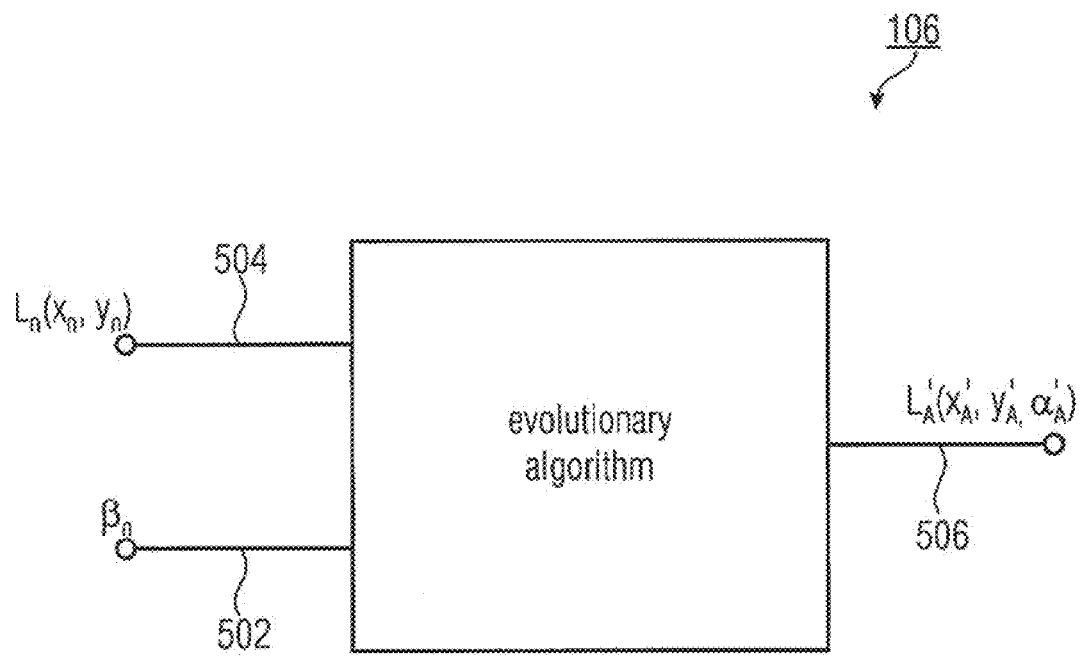
FIG. 5 shows a block diagram of an apparatus for determining an estimated value for an absolute location of a receiving element in accordance with an embodiment of the present invention.

As soon as all of the measuring data have been collected, the evolutionary algorithm (EA) may be started on the basis thereof. In accordance with an embodiment of the present invention, the measuring data collected, i.e. the angles of arrival $β_n$ and the associated measuring positions $L_n(x_n, y_n)$ (n=1, 2, ..., N), are handed over, for this purpose, to the apparatus 106 for estimating, the schematic block diagram of which is depicted in FIG. 5.

In accordance with an embodiment, the apparatus 106 comprises a first interface 502 to be able to receive the localization data $β_n$. In addition, it comprises a second interface 504 to be able to receive the measuring positions $L_n(x_n, y_n)$ of the movable signal source 104. On the output side, a third interface 506 is provided so as to be able to output the estimated value $L_A$ for the absolute location (position and orientation) of the receiving element 102. The output signals $L_A'$ ($x_A', y_A', α_A'$) are determined by an evolutionary algorithm from the input signals $L_n(x_n, y_n)$ I.e. the evolutionary algorithm processes the localization data $β_n$ and the positional data $L_n(x_n, y_n)$ and in response thereto outputs an estimated value $L_A'(x_A', y_A', α_A')$ for the position and the orientation (see FIG. 3) of the receiving element 102. Additionally, accuracy information may be provided, i.e. information about the degree of accuracy of the estimation $L_A'$. This will be possible when the equation system is over-determined, i.e. when there are more measuring values available than represent the absolute minimum. The accuracy information may then be determined, for example, from a deviation of a fitness function F(I) for each estimated-value individual I from a maximum value of the fitness function.

An embodiment of the evolutionary algorithm will be addressed in detail below.

Each estimated-value individual I(x,y,α) is represented by estimated values of the absolute position $x_A$, $y_A$ and the absolute orientation $α_A$ of the receiving element 102. $α_A$ is defined as a positive angle between the x axis of the reference coordinate system and a zero-degrees point of the receiving element, measured in a radian measure. By way of example, x and y are measured in millimeters, a in degrees. The number of estimated-value individuals of one iteration of the evolutionary algorithm is referred to as an estimated-value population P.

A fitness function F(I) for each estimated-value individual I is calculated by simulating the angle of arrival in accordance with $$β_{I,n} = \arctan\left(\frac{\Delta y_n}{\Delta x_n}\right) - α_I \quad (1)$$

$$\Delta y_n = y_n - y_I \text{ and } \Delta x_n = x_n - x_I, \quad (2)$$

wherein $(x_n, y_n)$ corresponds to a measuring point, $(x_1, y_1)$ corresponds to the individual estimated value for the antenna position, and $α_1$ corresponds to the individual estimated value for the antenna orientation. The fitness function F(I) for an estimated-value individual I is obtained in that the N simulated angles of arrival $β_{1,n}$ are compared to the angle of arrival measured in each case, for example in accordance with $$F(I) = \sum_n (π - |β_{I,n} - β_n|)^2. \quad (3)$$

In each iteration of the evolutionary algorithm, a follow-up population $P_S$ of estimated-value individuals is determined from P. In this context, new estimated-value individuals are generated by three different operations:
a) selection,
b) recombination, and
c) mutation.

For selection, a group of surviving estimated-value individuals $P_{sel}$, is selected in each iteration from the old population P in accordance with the following rules:
obtain the best estimated-value individual, i.e. that estimated-value individual which has a fitness function F(I) that corresponds to the best fitness,
select $$n = (1-r) \cdot p - 1 \quad (4)$$

estimated-value individuals with a probability:

$$Pr(I) = \frac{F(I)}{\sum_{j=1}^{P} F(I)} \quad (5)$$

In this context, r designates a recombination rate, and p a population size.
For recombination, in addition to the group $P_{sel}$, $$n = \frac{r \cdot p}{2} \quad (6)$$

pairs of estimated-value individuals are formed by cross-breeding estimated-value individuals of the old estimated-value population P with one other. Thus, one obtains a group of cross-bred estimated-value individuals $P_{cross}$. Each new pair $I_1'$ and $I_2'$ is obtained in that two parents $I_1$ and $I_2$ of the estimated-value population P are statistically selected in accordance with equation 5. Two descendants $I_1'$ and $I_2'$ are obtained from $I_1$ and $I_2$ and are added to the group $P_{cross}$. In accordance with an embodiment, a descendant is a weighted average of its parents $I_1$ and $I_2$. To this end, a random weight $a \in [0; 1]$ is selected. The descendants $I_1'(x_1',y_1', \alpha_1')$ and $I_2'(x_2',y_2',\alpha_2')$ are then obtained in accordance with $$x_1' = a \cdot x_1 + b \cdot x_2;\ x_2' = b \cdot x_1 + a \cdot x_2; \tag{7}$$

$$y_1' = a \cdot y_1 + b \cdot y_2;\ y_2' = b \cdot y_1 + a \cdot y_2; \tag{8}$$

$$\alpha_1' = a \cdot \alpha_1 + b \cdot \alpha_2 + \epsilon \tag{9}$$

$$\alpha_2' = b \cdot \alpha_1 + a \cdot \alpha_2 + \epsilon \tag{10}$$

with $$b = 1 - a \text{ and } \varepsilon \in \left[ -\frac{\pi}{40}; +\frac{\pi}{40} \right]_R. \tag{11}$$

For the embodiment described here, performance tests have revealed that an $\epsilon$ which is small in terms of amount results in a faster convergence in the cross-breeding of $\alpha$. An evaluation of potential good values has resulted in $\pm\pi/40$ as a good value. Other values may be better suited for $\epsilon$ in other applications, in particular for other localization areas.

The cross-bred group $P_{cross}$ and the surviving estimated-value individuals $P_{sel}$ together yield the subsequent estimated-value population $P_S$ with a number of p individuals.

Following this, a predetermined fraction m of the subsequent estimated-value population $P_S$ is mutated. m therefore designates a mutation rate. A mutation merely refers to a randomly selected estimated-value attribute x, y or $\alpha$ of a mutated individual. In the case of the estimated-value attributes x or y, values within a mutation range $[-100; +100]$ are provided for the present example. In the case of the attribute $\alpha$, a value within a range of $[\pi/6; +\pi/6]$ is added to $\alpha$. In the present example, the mutation range for x, y is selected to be about 10% of the localization range.

Following the mutation step, the estimated-value population $P_S$ is now referred to as the new estimated-value population P with which the next iteration step of the evolutionary algorithm is performed. I.e., for each estimated-value individual of the new estimated-value population P, a fitness function F(I) is again determined, as was described above. It is on this basis that selection, recombination and mutation are performed again thereafter.

The evolutionary algorithm terminates when the fitness F of the best individual $I_{win}(x,y,\alpha)$ of an iteration exceeds or falls below a predetermined limiting value $F_T$—depending on whether large or small fitness values speak for fit individuals. Should the limiting value $F_T$ not be reached, the evolutionary algorithm will also terminate once a maximum number of iterations have been exceeded. The best individual $I_{win}(x,y,\alpha)$ will then represent the estimated antenna location $L_A'$ having the position $(x_A', y_A')$ and the orientation $\alpha_n'$.

The evolutionary algorithm described in the preceding paragraphs may be summarized with the following pseudo code:

```
Input:   Positions L_n with an angle of arrival β_n of the
         signal(s), said angle having been measured accordingly
Output:  Location, i.e. position and orientation, of the antenna
1    P ← initialize( )
2    h ← evaluate(P)
3    while min(fitness(h)) > F_T and i < i_max do
4    |    P_sel ← select(P)
5    |    P_cross ← recombine(P)
6    |    P_S ← P_sel + P_cross
7    |    P ← mutate(P_S)
8    |    h ← evaluate(P)
9    |__  i++;
10   return best(h)
```

The evolutionary algorithm is mainly determined by three parameters: the population size p, the mutation rate m, and the recombination rate r. Said quantities influence the performance of the algorithm. Finding the best parameter set (p, m, r) is also an optimization problem and depends on the target set for the evolutionary algorithm. For the present example, the target is to find a parameter set (p, m, r) which provides the smallest error between the estimated value $L_A'$ and the actual value $L_A$ within a predetermined time and/or with a predetermined computing expenditure.

In order to find the best parameter set for the evolutionary algorithm, simulation results for any useful parameter sets (p, m, r) were compared. A parameter set includes the triple (p, r, m), wherein $p \in [5; 80]$ with a step width of five individuals, and r, $m \in [0; 100]$ with a step width of 10%. The number of all of the possible constellations is $p \times r \times m = 16 \times 11 \times 11 = 1.936$ parameter sets. For each parameter set (p, m, r), 30 scenarios having a fixed number of four static measuring points $(x_n, y_n)$ ($n=1, \ldots, 4$) and a simulated angle of arrival $\beta_n$ of the signal(s) with a standard deviation of 2° were assumed. Said scenarios comprise three different antenna locations $L_A$ and are simulated for the time period of one second. This results in a simulation expenditure of $x \cdot 30 \cdot 1$ second=58,080 seconds=16.6 hours. For each simulated parameter set, the median of the distance between the estimated antenna location $(x_A', y_A', \alpha_A')$ and the actual location $(x_A, y_A, \alpha_A)$ was calculated in accordance with $$D = \sqrt{(x_A'-x_A)^2 + (y_A'-y_A)^2 + (10 \cdot [\alpha_A'-\alpha_A])^2}. \tag{12}$$

D may be considered to be some kind of error function and is utilized, in this connection, as an error of the estimated antenna location $L_A'$. To obtain a numeric representation of the quality of the results, the difference in the angles of arrival, weighted with 10, was added to D. The factor 10 was selected to give the angle error roughly the same dimension as x and y. A unit of the error function is to be designated by pt in the following. This is not a physical, but an artificially selected unit.

Figure 8:
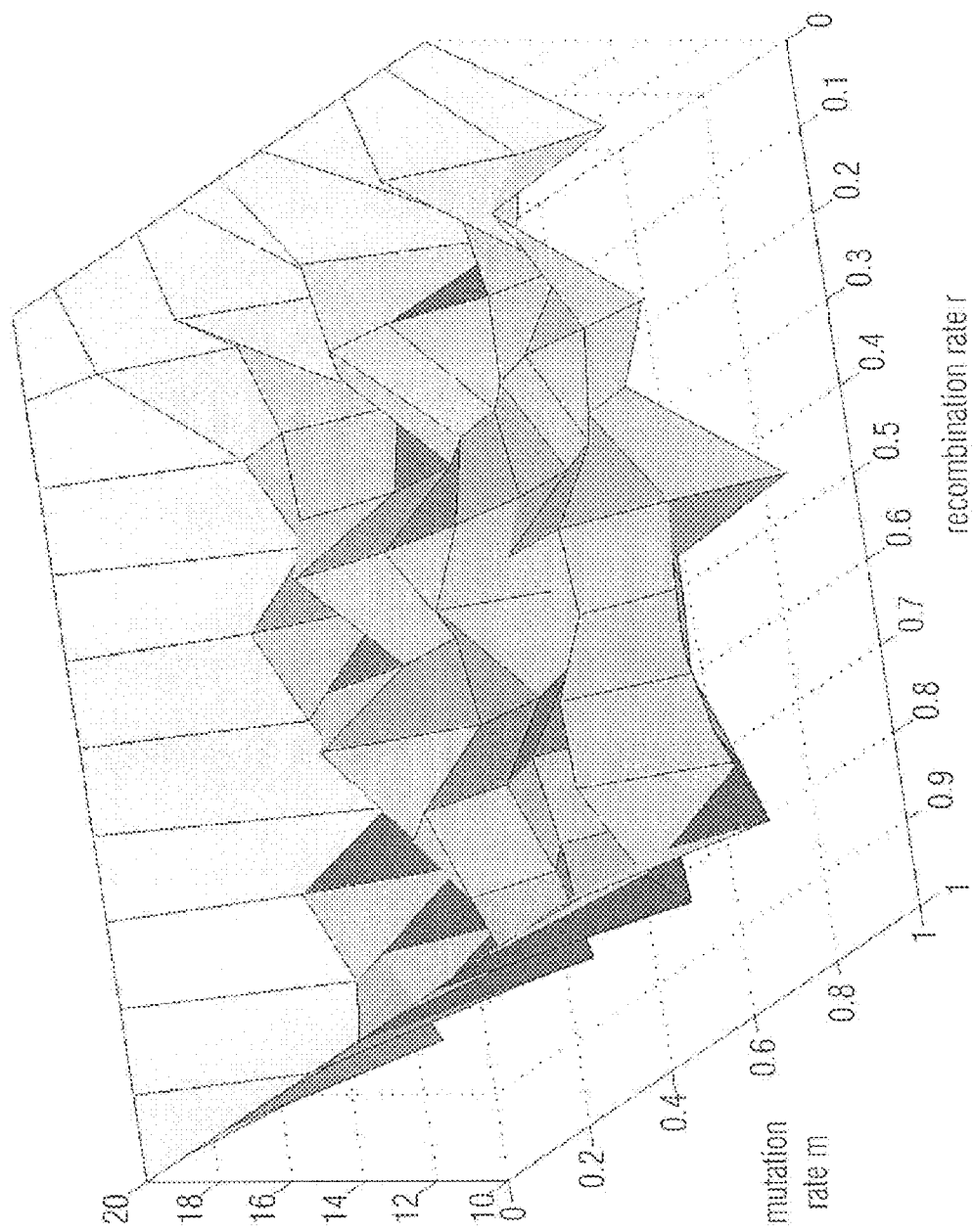
FIG. 8 shows a representation of simulation results in a search for optimum parameters for the evolutionary algorithm.

The simulation results are depicted in FIG. 8. The three-dimensional graph depicted has its minimum at a mutation rate m=100% and a recombination rate r=50% with a population size p=65. The mutation rate of m=100%, i.e. each estimated-value individual is mutated, is surprising. One possible explanation for this is that the search space has its minima near its maxima.

As will be shown below, the most influential parameter of the inventive estimation concept is the number N of the measuring points $(x_n, y_n)$ used that are headed for by the robot 104. As has already been explained, utilization of odometry causes a loss in accuracy over a distance covered. To minimize the influence of this error source, a specification is to be made as to which number N of different measuring points provides the best results. Three passes were simulated with different variances (0.25°, 1°, 2°) of the angle of arrival $\beta_n$. Each pass was repeated 45 times with different, random estimated-value individuals, once with random and once with static reference measuring points $(x_n, y_n)$ ($n=1, \ldots, N$).

Figure 9A:
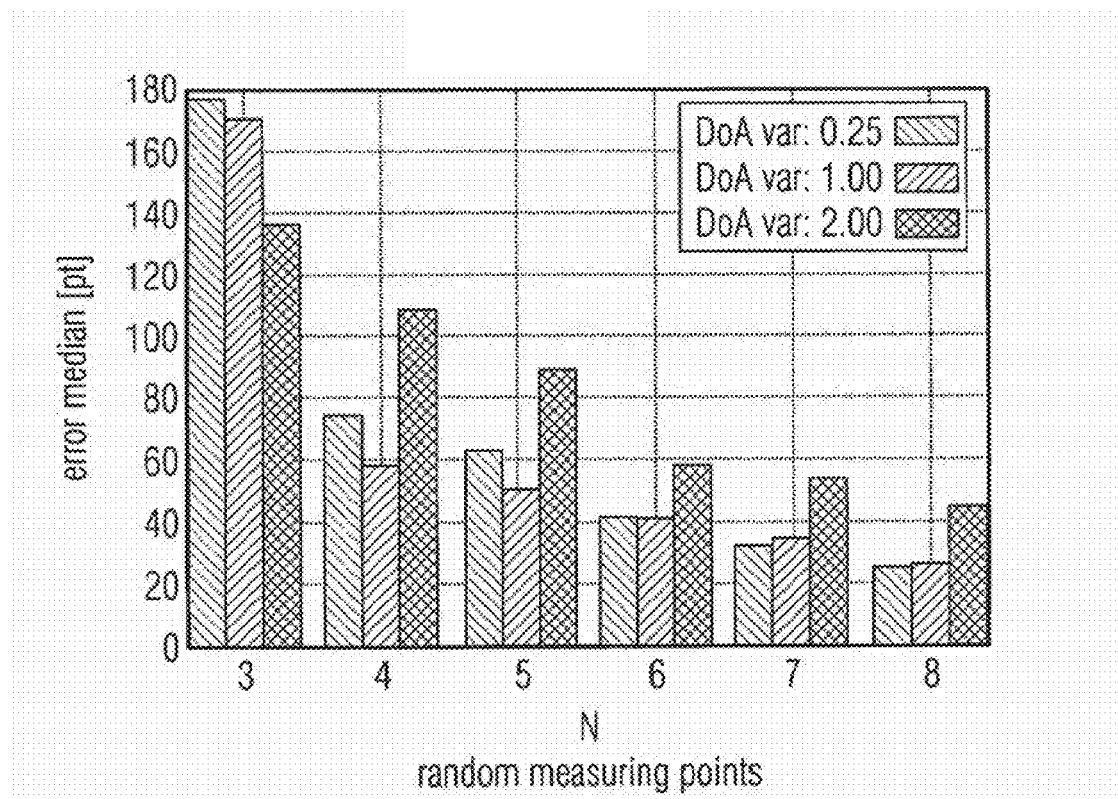
FIG. 9 shows a representation of an average estimated error for various angle-of-arrival variances, plotted over a number of measuring points.
Figure 9B:
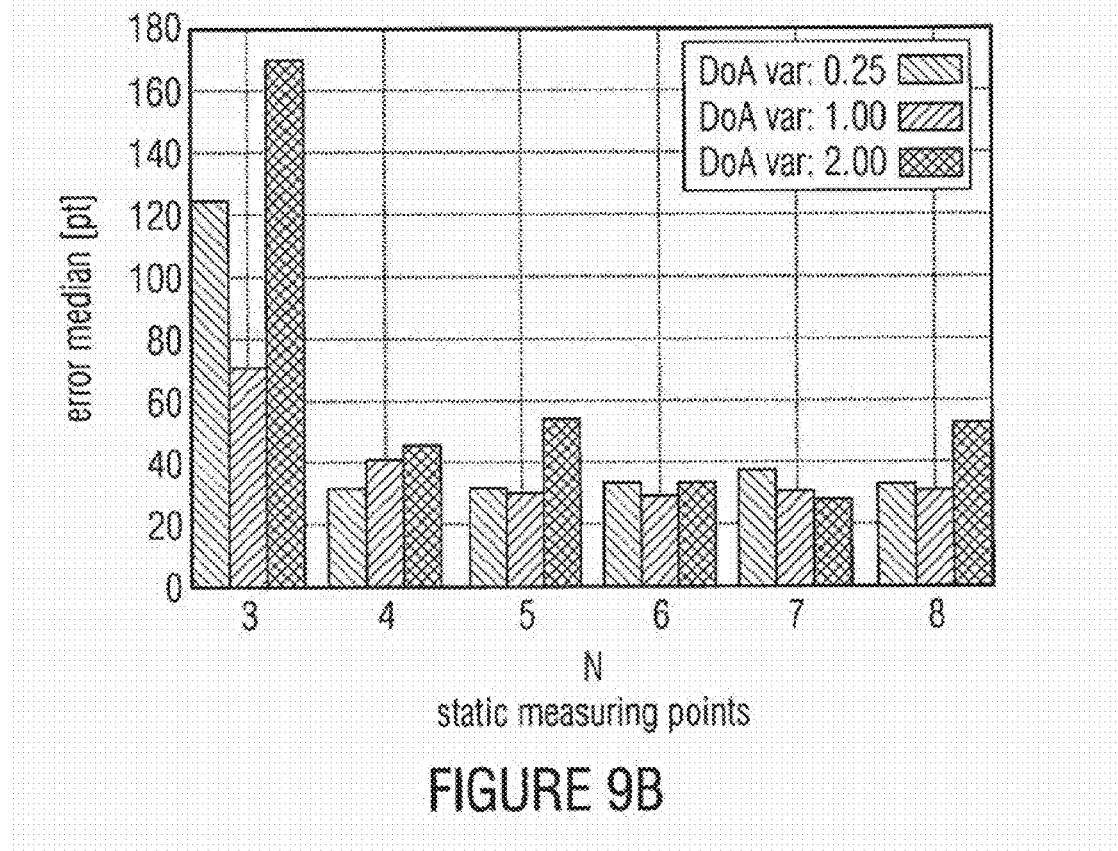

FIGS. 9a and 9b show the mean error for each of the three variances in the angles of arrival (0.25°, 1°, 2°) plotted across the number N of reference measurements used. Since three parameters ($x_A$, $y_A$, $\alpha_A$) are currently to be estimated, at least N=3 different reference measuring points may also be useful. The error was determined in accordance with equation 12. While the reference measuring points were randomly selected for FIG. 9a, the same fixed measuring points were used in each case for FIG. 9b.

In both cases, one may recognize that the error will drastically decrease at a transition from N=3 to N=4 measuring points, and in each case will converge to a constant error (approx. 50 pt for random measuring points and approx. 25 pt for static measuring points).

The decrease in the error of N=3 to N=4 measuring points may be explained by the insertion of redundancy.

FIGS. 11a-11d show a typical iteration progress of the inventive evolutionary algorithm comprising a specific noise in the measurements of the angle of arrival $\beta_n$. In the first iteration (FIG. 11a), the estimated-value individuals and/or their estimated-value attributes are randomly distributed over an entire considered area of 4000 mm×4000 mm. As the number of iteration steps increases, the estimated-value attributes (x, y, $\alpha$) of the estimated-value individuals are constantly moving in the direction of the actual antenna location $L_A(x_A, y_A, \alpha_A)$ (FIGS. 11b and 11c) until finally almost all of them come to lie, following the 15$^{th}$ iteration, within a relatively narrow tolerance range around the actual location $L_A(x_A, y_A, \alpha_A)$. Convergence of the individuals to the actual location $L_A(x_A, y_A, \alpha_A)$ of the antenna array can be clearly recognized.

Figure 7:
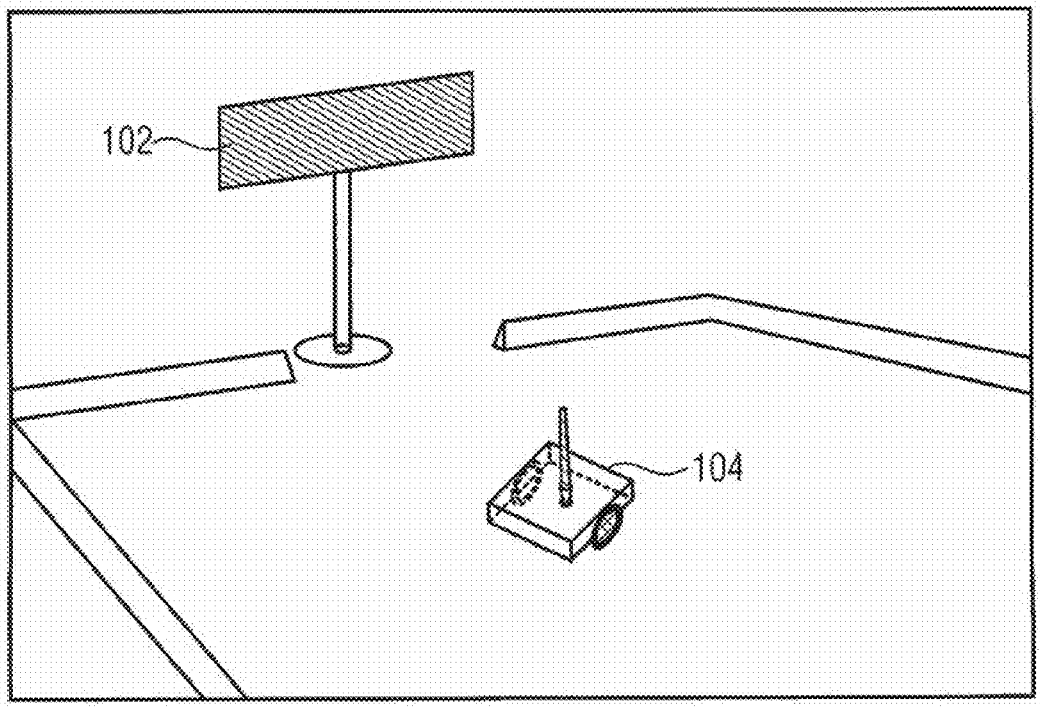
FIG. 7 shows an illustration of an experimental setup in accordance with an embodiment of the present invention.

The simulation results shown so far are also supported by real measurements. A measuring setup having a movable robot 104 and antenna array 102 is shown in FIG. 7.

Just like with the simulations, two series of measurements were performed—one with static measuring points and one with random measuring points ($x_n$, $y_n$) (n=1, . . . , N). Measurements were performed for three different antenna locations, and each measurement was repeated 15 times with five equally selected static and/or random measuring point sets, respectively. To avoid extensive measurements, eight measuring points were taken into account (per measuring point set) in each pass. Subsequently, the results were calculated for N measuring points (N=[3; 8] in that the first N measuring points of a pass were taken into account in each case.

Figure 10A:
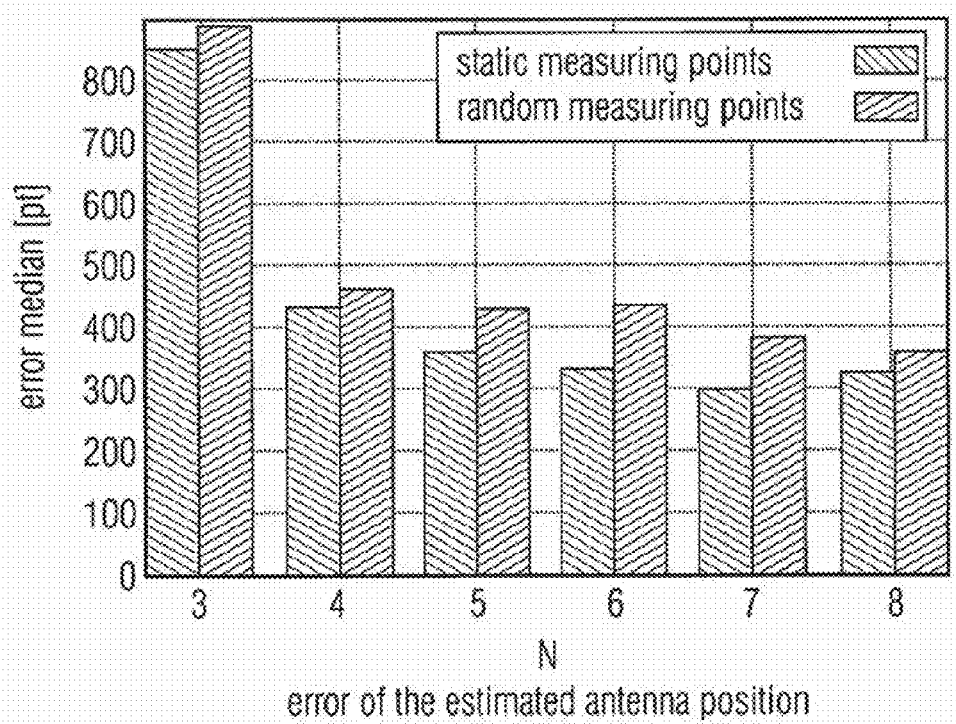
FIG. 10 shows a representation of an average estimated error of antenna positions and orientation, plotted over a number of measuring points.

FIG. 10a shows the mean error of the estimated location for various numbers N of static and/or randomly selected measuring points. If one allows the number N of measuring points to exceed a critical value (presently N=7), an increase in the error can be observed. This is connected to the decreasing accuracy of the self-localization of the robot 104 on account of odometry.

Figure 10B:
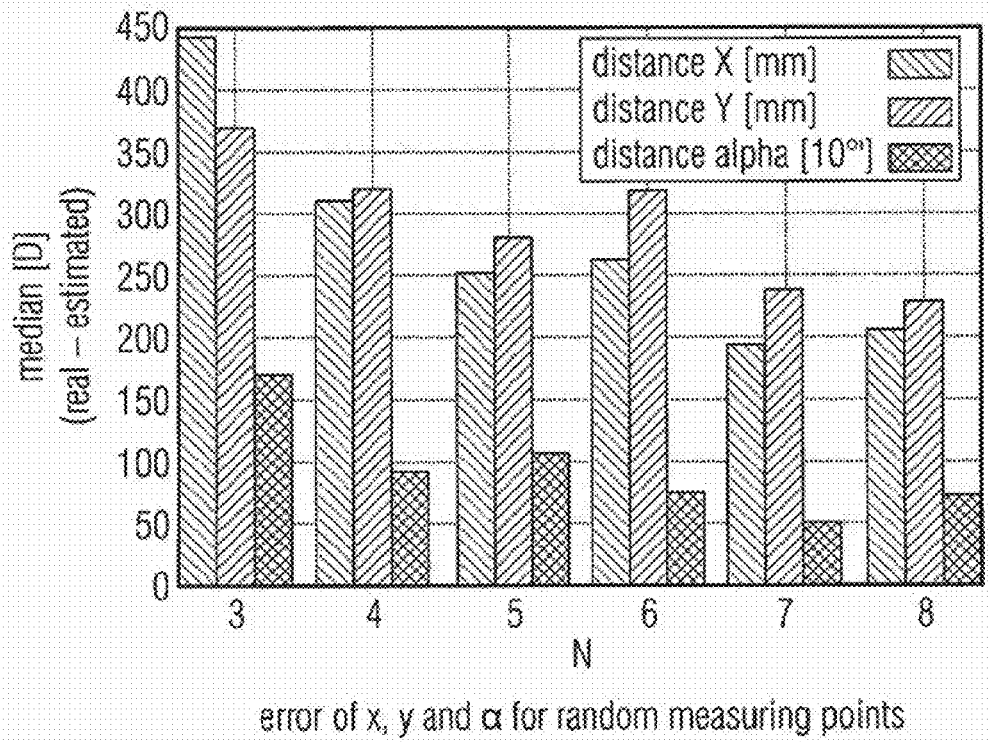
Figure 11A:
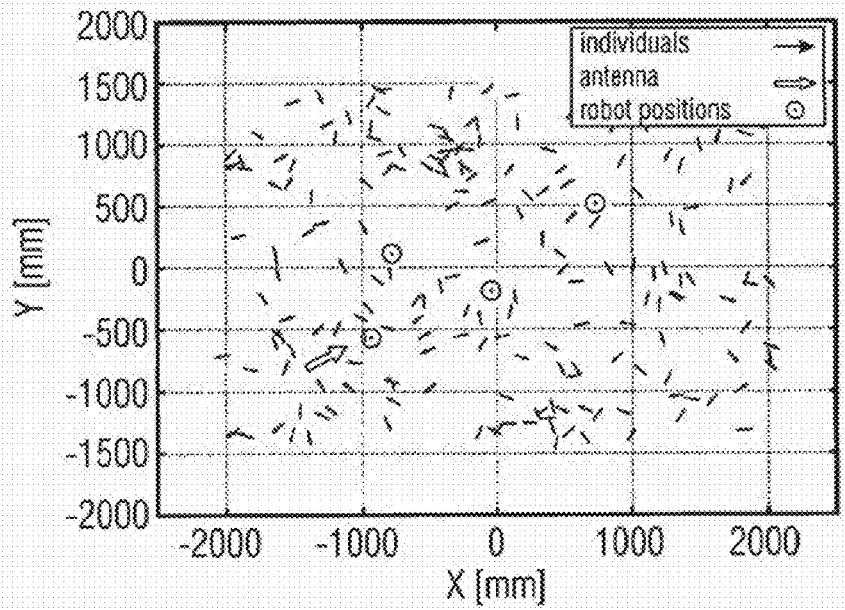
FIG. 11 shows an exemplary representation of a development (an evolution) of estimated-value individuals toward an optimum estimated value in accordance with an evolutionary algorithm.
Figure 11B:
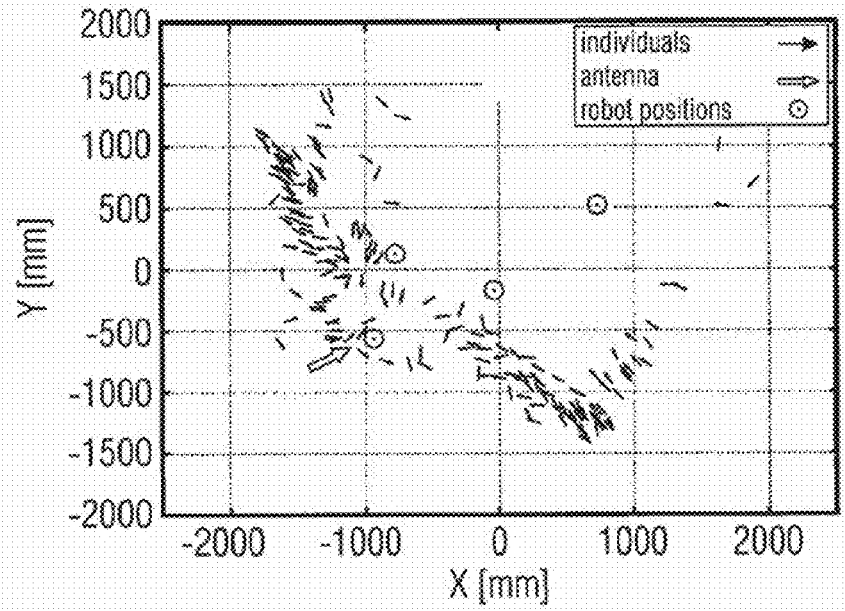
Figure 11C:
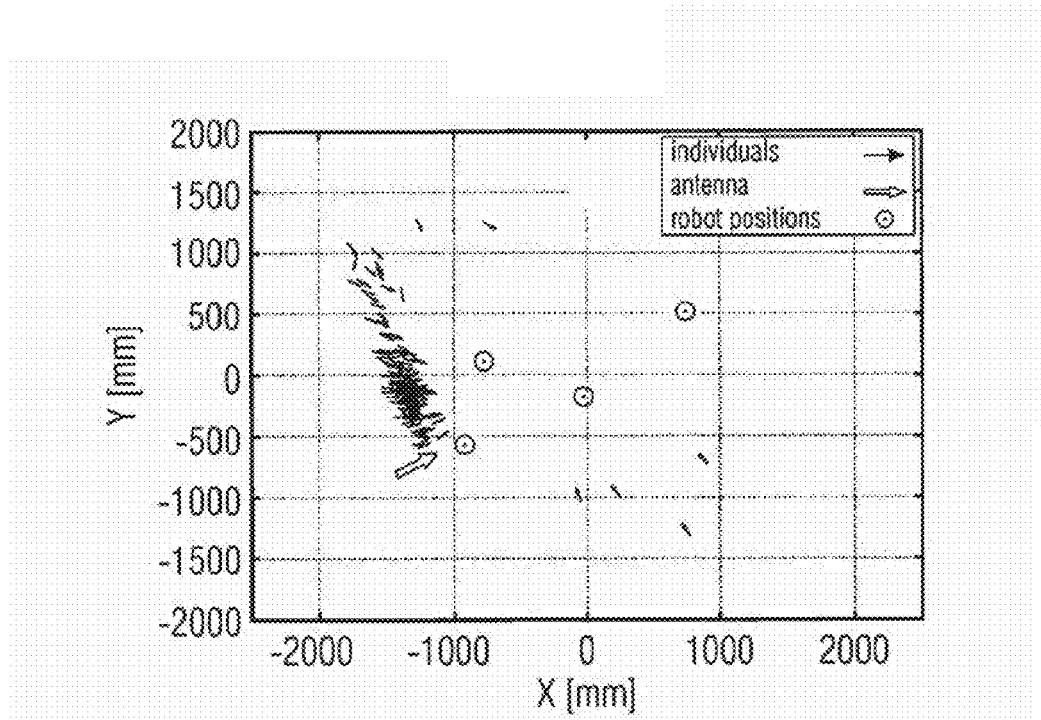
Figure 11D:
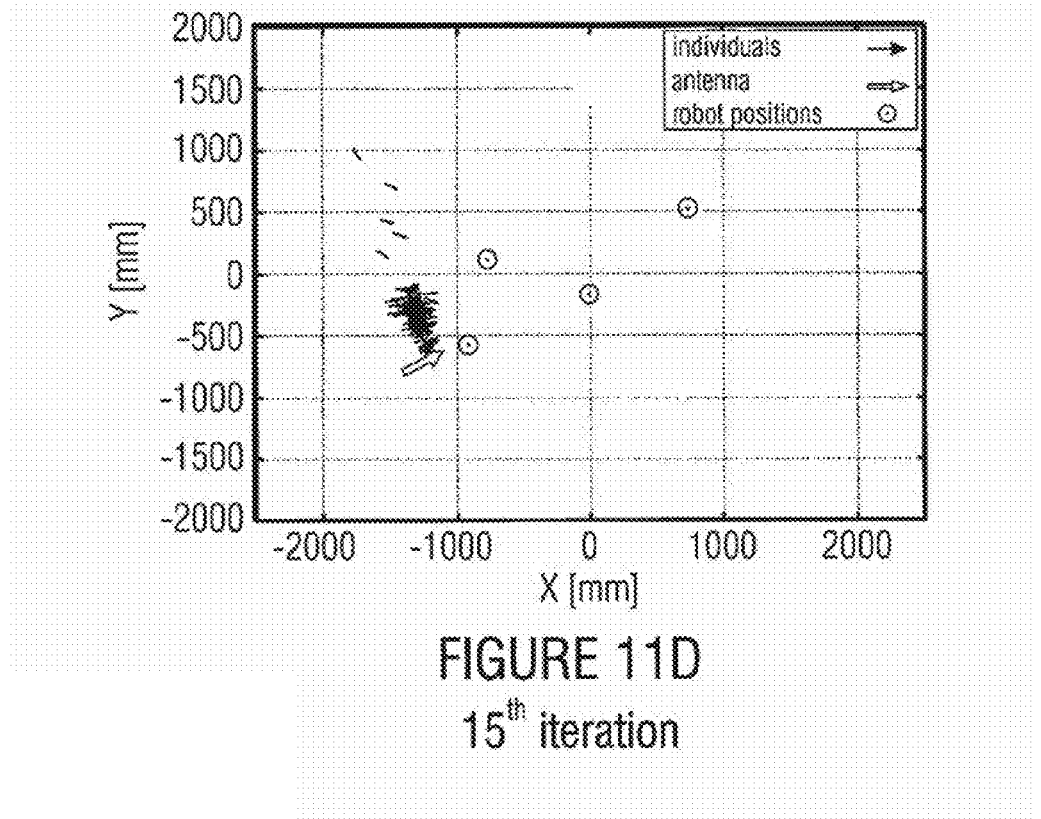

If one looks at the errors of the estimated-value attributes (x, y, a) individually in each case (FIG. 10b), one will recognize that both x and y each supply the largest error contribution. In the experiments described, the orientation $\alpha_A$ was estimated, on average, to an accuracy of 6° for N=7 measuring points.

When looking at the measurement results, one has to take into account that the present concept is a novel concept which is in the test phase and still provides quite some room for optimization. At any rate, it was shown that the inventive concept is suited to estimate the location of a receiving element of a localization system without any previous knowledge of the location of the receiving element. The inventive concept is based on an evolutionary algorithm which is employed to determine the location of the receiving element.

Even though the present description is based only on the estimation of the location of only one receiving element, the inventive concept naturally may be readily extended to include the location estimation of several receiving elements. In this case, the measurements for all of the receiving elements might be performed simultaneously. Subsequently, the evolutionary algorithm might sequentially determine the location of each of the several receiving elements. Even though the inventive concept has only been described for two dimensions for illustrative reasons, it may naturally also be extended to apply to three dimensions.

In summary, the present invention relates to a concept for initializing infrastructure-based position finding and/or localization systems. Embodiments are based on a fully/partly autonomous vehicle by means of which the localization system is calibrated. What is generated is site- and location-related information of the receiving elements of the localization system which are useful for the actual function thereof. The location information may be calculated by means of an evolutionary algorithm which may be employed for various localization technologies. In this context it shall be noted once again that embodiments of the present invention are not limited to localization data in the form of angles of arrival (AoA), but that other localization data may also be used which indicate a relative location of the receiving element with respect to the movable signal source, such as RSSI values, signal run times in the form of ToA, TDoA (time difference of arrival) or RTT, depending on the localization technology employed.

In the embodiment described, the angle of arrival of the receiving element was utilized for determining the fitness function, it being possible to calculate the angle $\beta_n'$ with $$\beta_n' = \arctan\left(\frac{x_n - x}{y_n - y}\right) - \alpha$$

while assuming a position having an estimated angle $\alpha$. The fitness function may then be determined as a square error of the calculated angle to the measured angle for the assumed location of the receiving element:

$$F(I) = \Sigma(|\beta_n' - \beta_n|)^2.$$

Accordingly, optional normalization between 0 and 1 will yield the above equation (3).

In embodiments of the invention, the localization data may comprise a signal arrival time from which a distance from the signal source may be determined, the fitness function then being determined on the basis of such localization data. The time of arrival may be an arrival time of the signals at the receiving element or a round-trip time at which the signals arrive back at the signal source. The localization data may thus be reduced to a distance $d_n$, i.e. a measured distance from the measuring point. To determine the fitness function, an estimated position is used again, so that a calculated distance $d_n'$ may be calculated as follows:

$$d_n' = \sqrt{(x_n - x)^2 + (y_n - y)^2}.$$

Thus, the fitness function is the square error of the calculated distance to the measured distance for an estimated, i.e. assumed, location of the receiving element. The fitness function may thus be calculated to be:

$$F(I) = \Sigma_n (d_n' - d_n)^2.$$

Again, the best fitness is min(F(I)).

In general terms, in embodiments of the invention, a fitness function may be determined in that localization data are detected and/or calculated in accordance with a localization method, which data are compared, via a square error, to data associated with an assumed and/or estimated location, or position. It is also possible for several of the localization data described to be considered in the fitness function, it being possible to add the individual fitness functions, e.g. $F(I) = F_{AOA}(I) + F_{RTT}(I)$.

As was described above, AoA (which is sometimes also referred to as DoA (direction of arrival)), ToA, TDoA (time difference of arrival) or RTT may be used as localization data in embodiments. As to TDoA, several receiving elements may be implied whose positions enter into the fitness function in parallel.

Depending on the circumstances, the inventive method of determining an estimated value for an absolute location of a receiving element may be implemented in hardware or in software. Implementation may be on a digital storage medium, in particular a disc, CD or DVD with electronically readable control signals which may cooperate with a programmable computer system such that the inventive method is performed. The invention thus generally also consists in a computer program product having a program code, stored on a machine-readable carrier, for performing the inventive method when the computer program product runs on a computer. In other words, the invention may thus be realized as a computer program having a program code for performing the method when the computer program runs on a computer.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:

1. A computer implemented or microcontroller implemented apparatus for determining estimated value attributes for a location of a receiving element within a reference system, the apparatus being configured to:
   obtain localization data derived from signals received by means of the receiving element from a movable signal source while the signal source is at at least two different measuring positions, wherein the localization data indicate a relative location of the receiving element with respect to the movable signal source, wherein the localization data comprise an angle of arrival of the received signals on the receiving element and/or a signal arrival time from which a distance from the signal source may be determined,
   determine the estimated value attributes on the basis of at least two different measuring positions of the movable signal source and the localization data corresponding thereto by means of an evolutionary algorithm,
   said evolutionary algorithm comprising:
      iteratively determining the estimated value attributes on the basis of a plurality of estimated-value individuals of estimated-value attributes for the location of the receiving element, the plurality of the estimated-value individuals forming an estimated-value population,
      forming, for each of the plurality of the estimated-value individuals in each iteration, a fitness function based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and
   a) terminating the iterations of the evolutionary algorithm and outputting the estimated value for the location of the receiving element when a fitness of an estimated-value individual comprising a fitness function which corresponds to the highest fitness exceeds a predefined limiting value, or
   b) terminating the iterations of the evolutionary algorithm and outputting the estimated-value individual comprising a fitness function which corresponds to a highest fitness if the predefined limiting value is not reached within a maximum number of iterations,
   wherein the apparatus is configured to select, from an estimated-value population in a current iteration, a group of surviving estimated-value individuals, to create a group of cross-bred estimated-value individuals, and to form, in each iteration, from the estimated-value population in a current iteration a subsequent estimated-value population from the group of surviving estimated-value individuals and the group of cross-bred estimated-value individuals.

2. The computer implemented or microcontroller implemented apparatus as claimed in claim 1, wherein the at least two measured localization data each correspond to a measured signal arrival angle of a measuring position of the moveable signal source on the receiving element.

3. The computer implemented or microcontroller implemented apparatus as claimed in claim 2, configured to determine, for each of the plurality of the estimated-value individuals, an estimated signal angle of arrival $\beta_{I,n}$ in accordance with $$\beta_{I,n} = \arctan(\Delta y_n / \Delta x_n) - \alpha_I$$

with regard to the at least two measuring positions of the movable signal source, wherein $\Delta y_n = y_n - y_I$, $\Delta x_n = x_n - x_I$, and $L_I(x_I; y_I; \alpha_I)$ signifies the $I^{th}$ individual estimated value for the position and orientation of the receiving element, wherein $\alpha_I$ corresponds to the individual estimated value for an orientation of the receiving element, and the apparatus being configured to determine, for each of the plurality of the estimated-value individuals, the fitness function in accordance with $$F(I) = \Sigma_n (\pi - |\beta_{I,n} - \beta_n|)^2,$$

wherein $\beta_n$ signifies the measured signal arrival angle from the $n^{th}$ measuring position of the movable signal source.

4. The computer implemented or microcontroller implemented apparatus as claimed in claim 1, configured to determine the group of surviving estimated-value individuals in accordance with the following specification:
   keep the estimated-value individual comprising a fitness function which corresponds to the highest fitness;
   determine $n = (1-r)*p - 1$ estimated-value individuals with a probability of $$Pr(I) = F(I) / \Sigma_{j=1}^{p} F(I),$$

wherein r corresponds to a recombination rate, p to a number of estimated-value individuals of the estimated-value population, and F(I) to a fitness function for each estimated-value individual which indicates the amount of deviation of the at least two estimated values for the localization data, said estimated values having been acquired by an individual estimated value for the location of the receiving element, from the at least two measured localization data.

5. The computer implemented or microcontroller implemented apparatus as claimed in claim 1, configured to acquire n=r*p/2 pairs of estimated-value individuals by cross-breeding estimated-value attributes of estimated-value individuals in a current iteration, that are based on $Pr(I)=F(I)/\Sigma_{j=1}^{P}F(I)$ so as to form the cross-bred group of estimated-value individuals.

6. The computer implemented or microcontroller implemented apparatus as claimed in claim 1, configured to form a pair $(I_1'(x_1';y_1';\alpha_1'); I_2'(x_2';y_2';\alpha_2'))$ of the descendant group of estimated-value individuals from a pair $(I_1(x_1;y_1;\alpha_1); I_2(x_2;y_2;\alpha_2))$ of the estimated-value population in a current iteration in accordance with $$x_1'=ax_1+bx_2; y_1'=ay_1+by_2;$$

$$x_2'=bx_1+ax_2; y_1'=by_1+ay_2;$$

$$\alpha_1'=a\alpha_1+b\alpha_2+\epsilon; \alpha_2'=b\alpha_1+a\alpha_2+\epsilon;$$

with $a\in[0;1]$, $b=1-a$ and $\epsilon\in[-\pi/x;+\pi/x]$, wherein $x\in[1;100]$.

7. The computer implemented or microcontroller implemented apparatus as claimed in claim 1 configured to subject a predefined fraction of the subsequent estimated-value population to a mutation in that one of the estimated attributes is changed within a respectively predefined range.

8. The computer implemented or microcontroller implemented apparatus as claimed in claim 1, wherein the location comprises a position and an orientation of the receiving element within a reference coordinate system.

9. The computer implemented or microcontroller implemented apparatus as claimed in claim 1, wherein the signals are electromagnetic signals.

10. The computer implemented or microcontroller implemented apparatus as claimed in claim 1, wherein the receiving element comprises an antenna for receiving the electromagnetic signals.

11. The computer implemented or microcontroller implemented apparatus as claimed in claim 10, wherein the receiving element comprises an antenna array comprising at least two antenna elements.

12. A system comprising
   a receiving element at a location within a reference system;
   a signal source that is movable to different measuring positions and which may send out signals that can be received by the receiving element, on which basis localization data may be determined which indicate a relative location of the receiving element with respect to the movable signal source; and
   an apparatus for determining estimated value attributes for the location of the receiving element within the reference system based on localization data derived from signals received by means of the receiving element from the movable signal source while the movable signal source is at different measuring positions, wherein the localization data indicate a relative location of the receiving element with respect to the movable signal source, wherein the localization data comprising an angle of arrival of the received signals on the receiving element and/or a signal arrival time from which a distance from the signal source may be determined,
   the apparatus being configured to determine the estimated value attributes on the basis of at least two different measuring positions of the movable signal source and the localization data corresponding thereto by means of an evolutionary algorithm,
   said evolutionary algorithm comprising:
   iteratively determining the estimated value attributes on the basis of a plurality of estimated-value individuals of estimated-value attributes for the location of the receiving element, the plurality of the estimated-value individuals forming an estimated-value population,
   forming, for each of the plurality of the estimated-value individuals in each iteration, a fitness function based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and
   a) terminating the iterations of the evolutionary algorithm and outputting the estimated value for the location of the receiving element when a fitness of an estimated-value individual comprising a fitness function which corresponds to the highest fitness exceeds a predefined limiting value, or
   b) terminating the iterations of the evolutionary algorithm and outputting the estimated-value individual comprising a fitness function which corresponds to a highest fitness if the predefined limiting value is not reached within a maximum number of iterations,
   wherein the apparatus is configured to select, from an estimated-value population in a current iteration, a group of surviving estimated-value individuals, to create a group of cross-bred estimated-value individuals, and to form, in each iteration, from the estimated-value population in a current iteration a subsequent estimated-value population from the group of surviving estimated-value individuals and the group of cross-bred estimated-value individuals.

13. A method of determining estimated value attributes for a location of a receiving element within a reference system, comprising:
   sending out signals by means of a movable signal source while the movable signals source is at at least two different known measuring positions;
   receiving the signals by means of the receiving element;
   determining, on the basis of the signals received, localization data which indicate a relative location of the receiving element with respect to the movable signal source,
   wherein the localization data comprising an angle of arrival of the received signals on the receiving element and/or a signal arrival time from which a distance from the signal source may be determined;
   determining the estimated value attributes on the basis of the at least two different measuring positions of the signal source and of the localization data corresponding thereto by means of an evolutionary algorithm method,
   said evolutionary algorithm comprising:
   iteratively determining the estimated value attributes on the basis of a plurality of estimated-value individuals of estimated-value attributes for the location of the receiving element, the plurality of the estimated-value individuals forming an estimated-value population, forming, for each of the plurality of the estimated-value individuals in each iteration, a fitness function based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and a) terminating the iterations of the evolutionary algorithm and outputting the estimated value for the location of the receiving element when a fitness of an estimated-value individual comprising a fitness function which corresponds to the highest fitness exceeds a predefined limiting value, or b) terminating the iterations of the evolutionary algorithm and outputting the estimated-value individual comprising a fitness function which corresponds to a highest fitness if the predefined limiting value is not reached within a maximum number of iterations, further comprising selecting, from an estimated-value population in a current iteration, a group of surviving estimated-value individuals to create a group of cross-bred estimated-value individuals, and forming, in each iteration, from the estimated-value population in a current iteration a subsequent estimated-value population from the group of surviving estimated-value individuals and the group of cross-bred estimated-value individuals.

14. A computer program product for use in a computer, the computer program product comprising a non-transitory computer readable medium storing computer executable instructions that, when executed by the computer, cause the computer to perform a method of determining estimated value attributes for a location of a receiving element within a reference system, comprising:

sending out signals by means of a movable signal source while the movable signal source is at at least two different measuring positions;

receiving the signals by means of the receiving element;

determining, on the basis of the signals received, localization data which indicate a relative location of the receiving element with respect to the movable signal source, wherein the localization data comprising an angle of arrival of the received signals on the receiving element and/or a signal arrival time from which a distance from the signal source may be determined;

determining the estimated value attributes on the basis of the at least two different measuring positions of the signal source and of the localization data corresponding thereto by means of an evolutionary algorithm, said evolutionary algorithm comprising:

iteratively determining the estimated value attributes on the basis of a plurality of estimated-value individuals of estimated-value attributes for the location of the receiving element, the plurality of the estimated-value individuals forming an estimated-value population, forming, for each of the plurality of the estimated-value individuals in each iteration, a fitness function being based on the localization data measured and on corresponding measuring positions of the signal source, an estimated-value being determined for corresponding localization data for each estimated-value individual on the basis of the at least two different measuring positions and of an estimated value for the location of the receiving element, so that the fitness function for each estimated-value individual indicates the amount of deviation of the at least two estimated values for the localization data, said estimated values having been acquired by an individual estimated value for the location of the receiving element, from at least two measured localization data, and a) terminating the iterations of the evolutionary algorithm and outputting the estimated value for the location of the receiving element when a fitness of an estimated-value individual comprising a fitness function which corresponds to the highest fitness exceeds a predefined limiting value, or b) terminating the iterations of the evolutionary algorithm and outputting the estimated-value individual comprising a fitness function which corresponds to a highest fitness if the predefined limiting value is not reached within a maximum number of iterations, further comprising selecting, from an estimated-value population in a current iteration, a group of surviving estimated-value individuals to create a group of cross-bred estimated-value individuals, and forming, in each iteration, from the estimated-value population in a current iteration a subsequent estimated-value population from the group of surviving estimated-value individuals and the group of cross-bred estimated-value individuals.

* * * * *

UNITED STATES PATENT AND TRADEMARK OFFICE
CERTIFICATE OF CORRECTION

| | | |
|---|---|---|
| PATENT NO. | : 8,791,860 B2 | Page 1 of 1 |
| APPLICATION NO. | : 13/289287 | |
| DATED | : July 29, 2014 | |
| INVENTOR(S) | : Thorsten Edelhaeusser et al. | |

It is certified that error appears in the above-identified patent and that said Letters Patent is hereby corrected as shown below:

On the Title Page, item (73) Assignee:

"Fraunhofer-Gesellschaft zur Foederung der Angewandten Forshung E.V."

should read:

"Fraunhofer-Gesellschaft zur Foerderung der angewandten Forschung e.V."

In the Claims

Claim 13, on col. 20, line 48:

"...the movable signals source is at..."

should read:

"...the movable signal source is at..."

Signed and Sealed this
Fifth Day of May, 2015

Michelle K. Lee
*Director of the United States Patent and Trademark Office*